US008191535B2

(12) United States Patent
Bellis et al.

(10) Patent No.: US 8,191,535 B2
(45) Date of Patent: Jun. 5, 2012

(54) SLEEVE HYDROCARBON TRAP

(75) Inventors: Andrew George Bellis, Plymouth, MI (US); Scott Rollins, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/560,033

(22) Filed: Sep. 15, 2009

(65) Prior Publication Data

US 2010/0089372 A1 Apr. 15, 2010

Related U.S. Application Data

(60) Provisional application No. 61/104,657, filed on Oct. 10, 2008.

(51) Int. Cl.
*F02M 33/02* (2006.01)
*B01D 59/26* (2006.01)

(52) U.S. Cl. .......................... 123/516; 123/518; 96/154

(58) Field of Classification Search .................. 123/516, 123/518, 519, 520, 198 E; 96/134, 154
See application file for complete search history.

(56) References Cited

U.S. PATENT DOCUMENTS

| | | | | |
|---|---|---|---|---|
| 6,438,486 | B1 * | 8/2002 | Mancini | 701/104 |
| 6,440,200 | B1 * | 8/2002 | Sakakibara et al. | 96/134 |
| 6,637,415 | B2 | 10/2003 | Yoshioka et al. | |
| 6,692,551 | B2 * | 2/2004 | Wernholm et al. | 95/146 |
| 6,736,871 | B1 * | 5/2004 | Green et al. | 55/385.3 |
| 6,758,885 | B2 * | 7/2004 | Leffel et al. | 96/134 |
| 6,786,211 | B2 | 9/2004 | Takeyama et al. | |
| 6,835,234 | B2 * | 12/2004 | Leffel et al. | 96/108 |
| 6,913,001 | B2 * | 7/2005 | Abdolhosseini et al. | 123/519 |
| 6,997,977 | B2 * | 2/2006 | Dallas et al. | 96/153 |
| 7,168,417 | B2 * | 1/2007 | Arruda et al. | 123/518 |
| 7,213,581 | B2 * | 5/2007 | Burke et al. | 123/516 |
| 7,278,406 | B2 * | 10/2007 | Hagler | 123/516 |
| 7,288,223 | B2 | 10/2007 | Becker et al. | |
| 7,520,271 | B2 * | 4/2009 | Saito | 123/519 |
| 7,556,026 | B2 * | 7/2009 | Herald et al. | 123/516 |
| 7,610,904 | B2 * | 11/2009 | Treier et al. | 123/516 |
| 7,918,912 | B2 * | 4/2011 | Tomlin et al. | 55/385.3 |
| 7,976,619 | B2 * | 7/2011 | Huff | 96/134 |
| 2003/0192512 | A1 * | 10/2003 | Luley et al. | 123/519 |
| 2004/0079344 | A1 * | 4/2004 | Gimby et al. | 123/519 |
| 2004/0099253 | A1 | 5/2004 | Tschantz | |
| 2006/0054142 | A1 * | 3/2006 | Burke et al. | 123/518 |
| 2006/0096458 | A1 * | 5/2006 | Abdolhosseini et al. | 96/134 |
| 2006/0150811 | A1 * | 7/2006 | Callahan et al. | 95/146 |
| 2006/0266220 | A1 * | 11/2006 | Weber et al. | 96/134 |
| 2007/0246023 | A1 | 10/2007 | Saito | |
| 2007/0278034 | A1 | 12/2007 | Yamaura et al. | |
| 2009/0120046 | A1 * | 5/2009 | Huff | 55/290 |

OTHER PUBLICATIONS

Tschantz et al., “Activated Carbon and the Control of Evaporative Emissions in Air Induction Systems”, Sep. 29, 2003, MeadWestvaco Corp.—Carbon Dept.—Covington, VA, 25 pages total.

“Air Induction System Evaporative Emission Control Technologies”, Nov. 2002, MeadWestvaco Corporation Specialty Chemicals Division—Carbon Department Covington, VA, 40 pages total.

* cited by examiner

*Primary Examiner* — Thomas Moulis

(74) *Attorney, Agent, or Firm* — James Dottavio; Alleman Hall McCoy Russell & Tuttle LLP

(57) ABSTRACT

A sleeve hydrocarbon trap is provided. In some examples, the sleeve hydrocarbon trap includes a hydrocarbon adsorbing sleeve, the sleeve adapted to be positioned in a sensor bore and the sleeve including one or more hydrocarbon adsorbing layers, and a cage adapted to retain the hydrocarbon adsorbing sleeve in the sensor bore.

13 Claims, 10 Drawing Sheets

SLEEVE HYDROCARBON TRAP

CROSS REFERENCE TO RELATED APPLICATION

This application claims the benefit of U.S. Provisional Application 61/104,657, filed on Oct. 10, 2008, entitled SLEEVE HYDROCARBON TRAP, the entirety of which is hereby incorporated herein by reference for all purposes.

FIELD

The present application relates to a system for adsorbing hydrocarbons emitted from an engine air induction system of a vehicle during engine off soaks.

BACKGROUND AND SUMMARY

Hydrocarbon vapor emissions may be released from an engine air induction system during certain engine conditions, such as an engine off condition. Hydrocarbon traps may adsorb the hydrocarbons during engine off conditions, thus reducing the release of the hydrocarbon vapor emissions. Upon engine operation, the hydrocarbons may be desorbed and drawn into the engine, thus purging the hydrocarbon traps.

The inventors herein have recognized various issues with the current hydrocarbon traps. For example, in some systems, the hydrocarbon traps may impede and/or disrupt air flow in the air induction system. Traps that impede a flow of air through the air induction system may decrease engine performance. Further, disruption of the air flow in the air induction system may result in inaccurate sensor readings, such as inaccurate mass air flow (MAF) readings. Moreover, many traps must be specially-designed for a specific air induction system increasing costs for designing and implementing an effective hydrocarbon trap. In addition, some operators may tamper with the hydrocarbon traps and evidence of tampering with the trap may be difficult to detect.

Accordingly, as a brief summary, devices, systems and methods are disclosed for a sleeve hydrocarbon trap. In one example, a sleeve hydrocarbon trap is provided including a hydrocarbon adsorbing sleeve and a cage to retain the sleeve. The hydrocarbon adsorbing sleeve may include one or more hydrocarbon adsorbing sheet layers. The sleeve hydrocarbon trap may be adapted to be disposed in a MAF bore such that a MAF sensor penetrates through the sleeve and the cage. The hydrocarbon adsorbing sleeve may substantially abut an inner wall of the MAF bore reducing air flow disruption and decreasing air flow restriction. Further, the disclosed hydrocarbon trap may be tamper resistant and may be easily adapted to a variety of different vehicle applications while utilizing existing packaging space.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE FIGURES

A sleeve hydrocarbon trap, and related methods and systems are described below. The sleeve hydrocarbon trap may be integrated into an air induction system in an engine. The construction, placement, use and assembly of the sleeve hydrocarbon trap are described in more detail below. However, it may be appreciated that an engine may affect the placement and use of the hydrocarbon trap, i.e. due to packaging space and engine systems such as a combustion chamber or an intake manifold. Accordingly, an example engine is described and illustrated in regards to FIG. 1.

Figure 1:
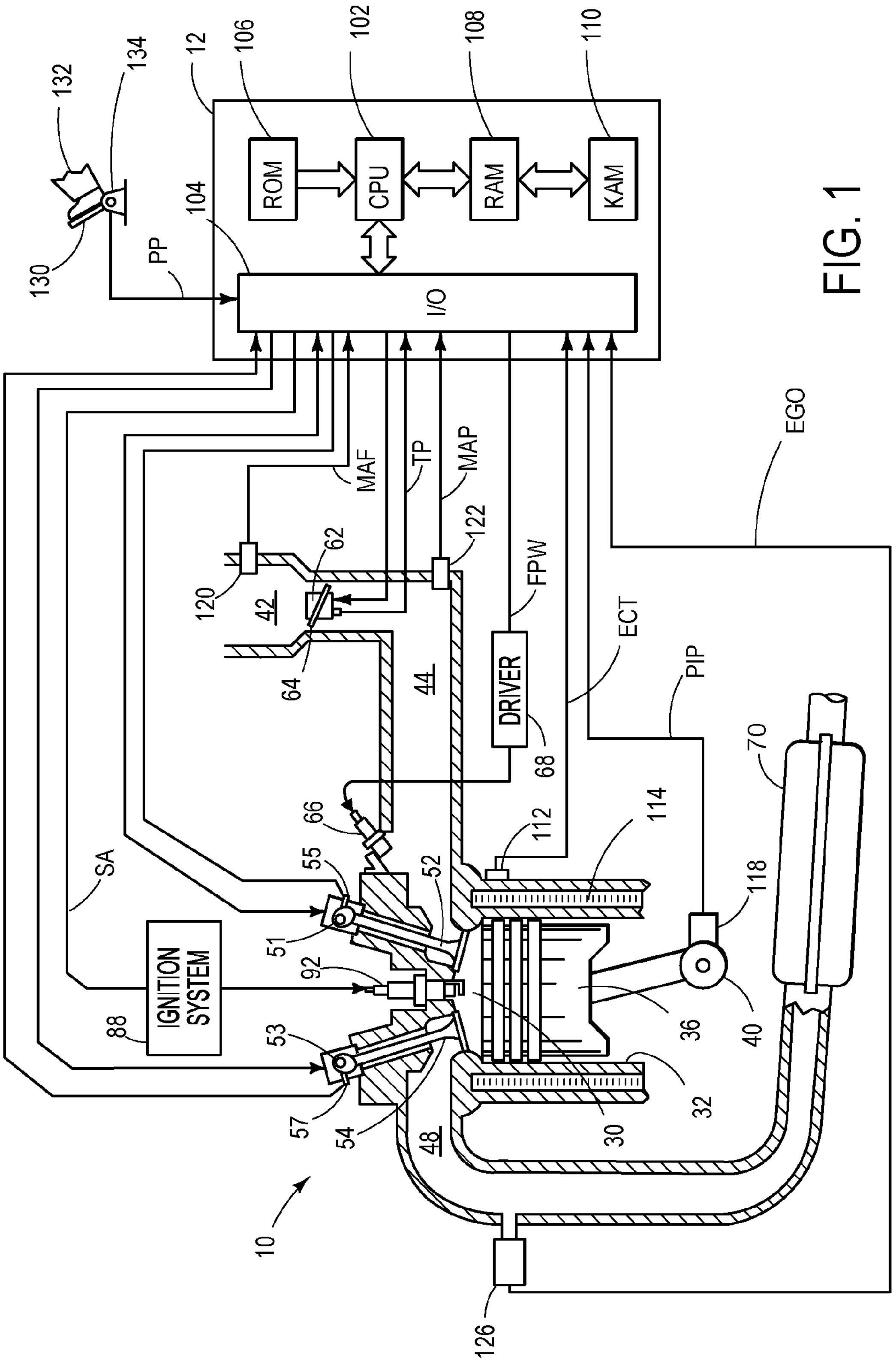
FIG. 1 is a schematic depiction of an example engine which may employ an air induction system including a sleeve hydrocarbon trap.

FIG. 1 is a schematic diagram showing one cylinder of multi-cylinder engine 10, which may be included in a propulsion system of an automobile or vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via clean air passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. Further, in some examples, throttle 62 and throttle plate 64 may be included in air induction system 200. The position of throttle plate 64 may be provided to controller 12 by throttle position signal TP. Intake passage 42 may include a mass air flow sensor 120 and a manifold air pressure sensor 122 for providing respective signals MAF and MAP to controller 12. In further examples, the clean air passage 42 may be included as part of an air induction system which may feature an air filter and/or a hydrocarbon trap.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
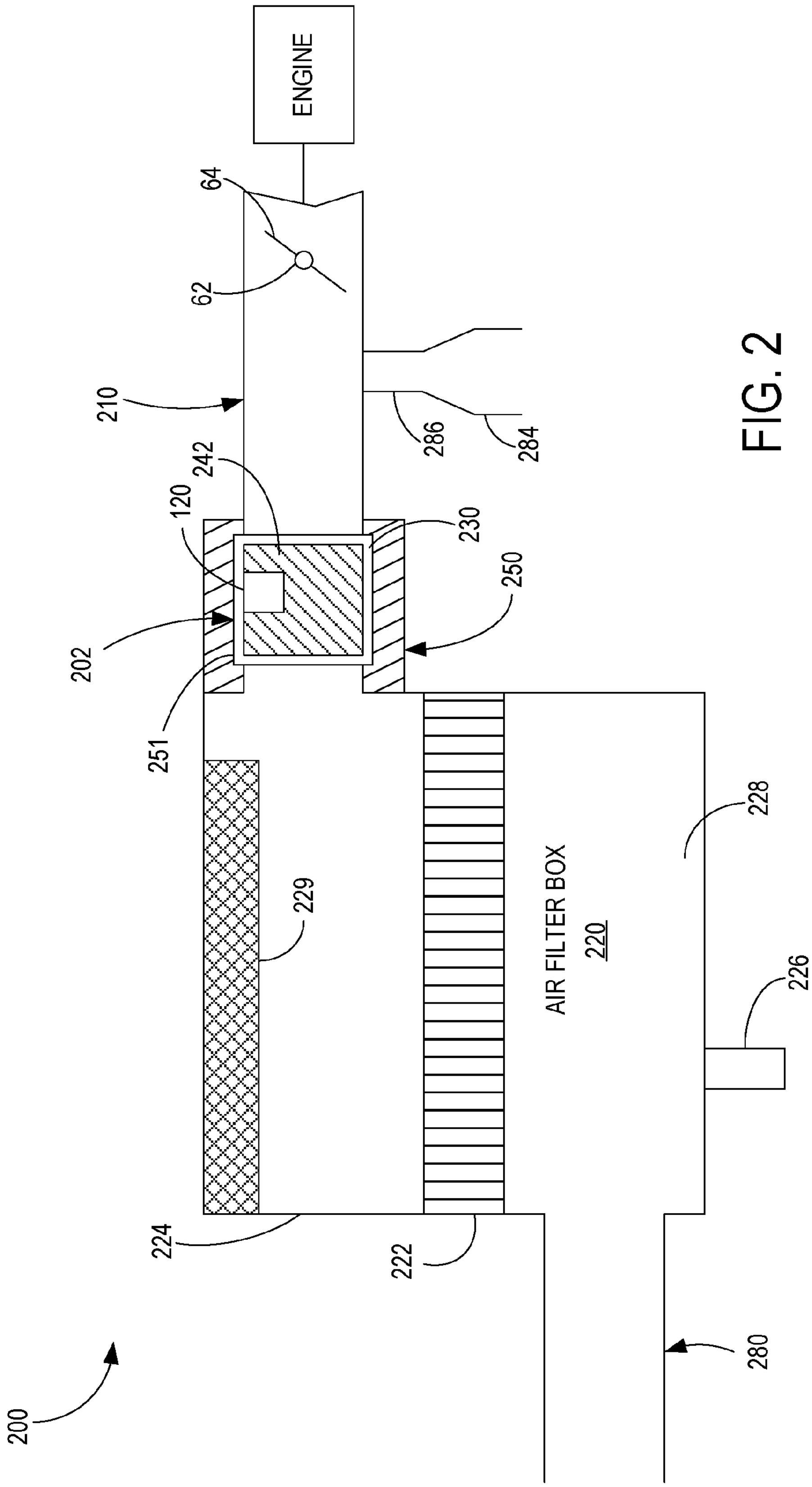
FIG. 2 is a schematic illustration of an example sleeve hydrocarbon trap included in an air induction system of an engine.

FIG. 2 provides a schematic illustration of an example air induction system 200 including a sleeve hydrocarbon trap 202. As described in more detail below, the disclosed sleeve hydrocarbon trap includes a cage and a hydrocarbon adsorbing sleeve with one or more hydrocarbon adsorbing sheet layers. The hydrocarbon trap may be disposed in the air induction system, such as in a MAF bore, such that the air flow is not disrupted by the sleeve hydrocarbon trap as the air travels through the bore. Further, as disclosed below, the sleeve hydrocarbon trap may utilize existing packaging space and inhibit tampering.

Turning more specifically to FIG. 2, the example air induction system 200 may include a dirty air duct 280, an air filter box 220 and a clean air duct 210. During engine operation, air flows from the dirty air duct 280 through air filter box 220 and clean air duct 210 to the engine. Further, clean air 210 may include a throttle body 62 and a throttle plate 64.

Air filter box 220 may include an air filter box cover 224, an air cleaner 222, a water drain 226 and an air filter box tray 228. Air cleaner 222 may be an air filter, for example. Further, one or more hydrocarbon traps, such as a bypass trap hydrocarbon trap 229 and/or a flow through trap (not shown) may be further disposed in the air filter box 220. In some examples the air filter box 220 has a limited size due to requirements of packaging space within the vehicle. In some such examples, the sleeve hydrocarbon trap, described in more detail below, may be integrated into the air filter box cover 224 and/or may be used in place of a bypass trap hydrocarbon trap disposed inside the air filter box 220.

During engine operation, the air passes from the air filter box 220 to clean air duct 210 through bore 250. In some examples, bore 250 may be an interface, joint, duct and/or coupling between the air filter box 220 and the clean air duct 210. Bore 250 may further include an inner wall 251. Inner wall 251 may define a passage or channel between the air filter box 220 and the clean air duct 210. Bore 250 may be a MAF bore including a MAF sensor positioned to detect the mass air flow through the air induction system. Although shown as a cylindrical bore, it should be appreciated that the MAF bore may be any shape or size or portion of the air induction system which includes or is substantially adjacent to a MAF sensor or other similar sensor. In the illustrated example, air flows through the MAF bore to clean air duct 210.

In addition, in some systems, a PCV opening 286 to a PCV fresh air port 284 may be disposed in the air induction system, such as along clean air duct 210. For example, the PCV opening 286 may be disposed between the MAF sensor and the throttle plate 64. The PCV fresh air port 284 may be coupled to a crankcase of the engine 10 and include further valving within a PCV system for controlling the flow of air between the clean air duct 210, the crankcase, and intake manifold. In alternate examples, PCV fresh air port 284 may be separate from the air induction system 200, i.e. uses a separate air filtration system and the separate air filtration system may include a hydrocarbon trap and/or hydrocarbon trap system, for example the sleeve hydrocarbon trap 202. It should be appreciated that in addition to the above ports, the clean air duct may include additional ports, such as a brake aspiration port, fuel tank purge port, etc.

During engine off soaks, evaporative emissions may migrate or diffuse in the opposite direction through the air induction system. The escape of the hydrocarbons from the air induction system may result in such hydrocarbons being released into the surrounding environment. For example, the unburned hydrocarbon fuel vapors may migrate from the engine and/or through the PCV opening 286 from the PCV fresh air port 284. Non-adsorbed emissions may flow through the air filter box 220, the air cleaner 222 and the dirty air duct 280, and/or the water drain 226.

In the illustrated embodiment, a sleeve hydrocarbon trap may be disposed, at least partially, in bore 250 and may include a cage 230 and a hydrocarbon adsorbing sleeve 242. The sleeve hydrocarbon trap may adsorb hydrocarbons, as described in more detail below. Hydrocarbon adsorbing sleeve 242 may be disposed in bore 250 substantially abutting an inner wall 251 and adjacent to a passage or channel defined within the bore. Abutting an inner wall 251 may reduce air flow disruption and decrease air flow restriction. The hydrocarbon adsorbing sleeve 242 may be retained against the inner wall 251 by the cage 230. Further the cage may minimally protrude from the inner wall and/or hydrocarbon adsorbing sleeve. In this way, the sleeve hydrocarbon trap 202 may have minimal disruption of the flow of air to the engine. Further, the sleeve hydrocarbon trap may be disposed before the PCV fresh air port, at a distance (e.g. more than 2 inches), such that any engine oil that may be pushed into the clean air duct during low engine vacuum operating conditions will not leak onto or otherwise contaminate the hydrocarbon trap. In some examples, any flow to or from the engine passes through the sleeve hydrocarbon trap. Thus, all the vapors emanating from inside the engine during engine off soaks may pass through the sleeve hydrocarbon trap before reaching the surrounding environment.

The hydrocarbon adsorbing sleeve 242 may be composed of rolled and/or layered hydrocarbon adsorbing material, such as hydrocarbon adsorbing sheets. The hydrocarbon adsorbing material may be made of any suitable material configured to adsorb hydrocarbons, for example, a carbon impregnated sheet or a carbon coated sheet of paper or foam, activated charcoal, zeolite, etc. The hydrocarbon adsorbing sleeve 242 may be adapted to adsorb, collect and/or adhere hydrocarbon gases, such as the "light ends" of gasoline. These "light ends" of gasoline have been found to be one of the primary constituents of the vapors emanating from a typical air induction system during engine off soaks. Although described as an adsorbing trap, in some examples, different absorbing materials, where gases are collected by full assimilation or incorporation, may also be incorporated as part of the sleeve hydrocarbon trap. In this way, the amount of hydrocarbons released to the surrounding environment or atmosphere can be substantially reduced or eliminated.

In the illustrated example, cage 230 may retain the hydrocarbon adsorbing sleeve 242 in bore 250. For example, cage 230 may retain the hydrocarbon sleeve such that it is disposed substantially adjacent or abutting inner wall 251. The cage may be made of plastic, or other suitable lightweight and durable material. The profile of the cage may be minimized reducing effects of air flow through the bore.

The cage may expose at least a portion of the hydrocarbon adsorbing sleeve 242 for adsorption of hydrocarbons. For example, cage 230 may include windows or other openings defined by ribs or other structure. Exposing portions of the hydrocarbon adsorbing sleeve 242 may enable sufficient communication between hydrocarbons migrating through the clean air duct 210, and the hydrocarbon adsorbing sleeve 242 to ensure sufficient absorption and desorption.

Thus, the sleeve hydrocarbon trap may be a lightweight trap and of a reduced-complexity. Further still, the disclosed sleeve hydrocarbon trap may not be vulnerable to the degradation which occurs as the various components and mechanical fasteners and adhesives wear down over time, such as through vehicle operation. As such, the sleeve hydrocarbon trap may have an extended product life. Further, as a passive emissions control device, the sleeve hydrocarbon trap does not require OBD II monitoring.

Figure 3:
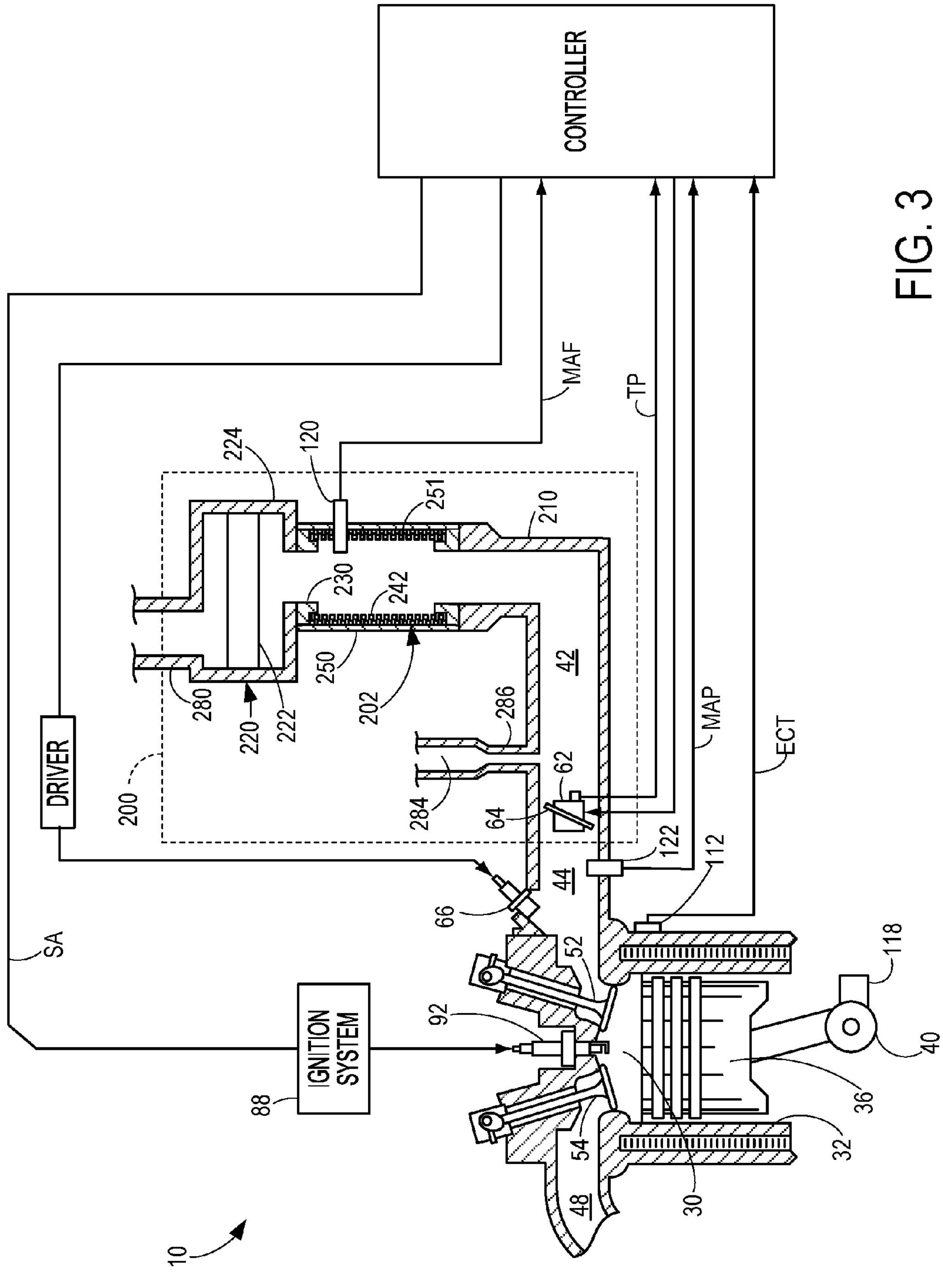
FIG. 3 is another schematic depiction of an example engine with a sleeve hydrocarbon trap.

FIG. 3 is another schematic depiction of an example engine 10 with a sleeve hydrocarbon trap 202. The sleeve hydrocarbon trap may be included in an air induction system 200, as described above. In the illustrated example, hydrocarbon adsorbing sleeve 242 may substantially abut an inner wall 251 and be retained by cage 230. The cage and the hydrocarbon adsorbing sleeve may minimally protrude from the inner wall 251 and may be exposed to the flow of air from an air filter box 220 to a clean air duct 210. Further, the hydrocarbon adsorbing sleeve 242 may be a hydrocarbon adsorbing material rolled into one or more hydrocarbon adsorbing sheet layers.

A MAF sensor 120 is shown penetrating bore 250, cage 230 and hydrocarbon adsorbing sleeve 242. Although shown with the MAF sensor as extending in an internal region of the sleeve, it should be appreciated that the MAF sensor may be at any position in the bore. Further, in alternate examples, bore 250 may be any shape or size or portion of the air induction system which includes or is substantially adjacent to a MAF sensor or other similar sensor.

Figure 4:
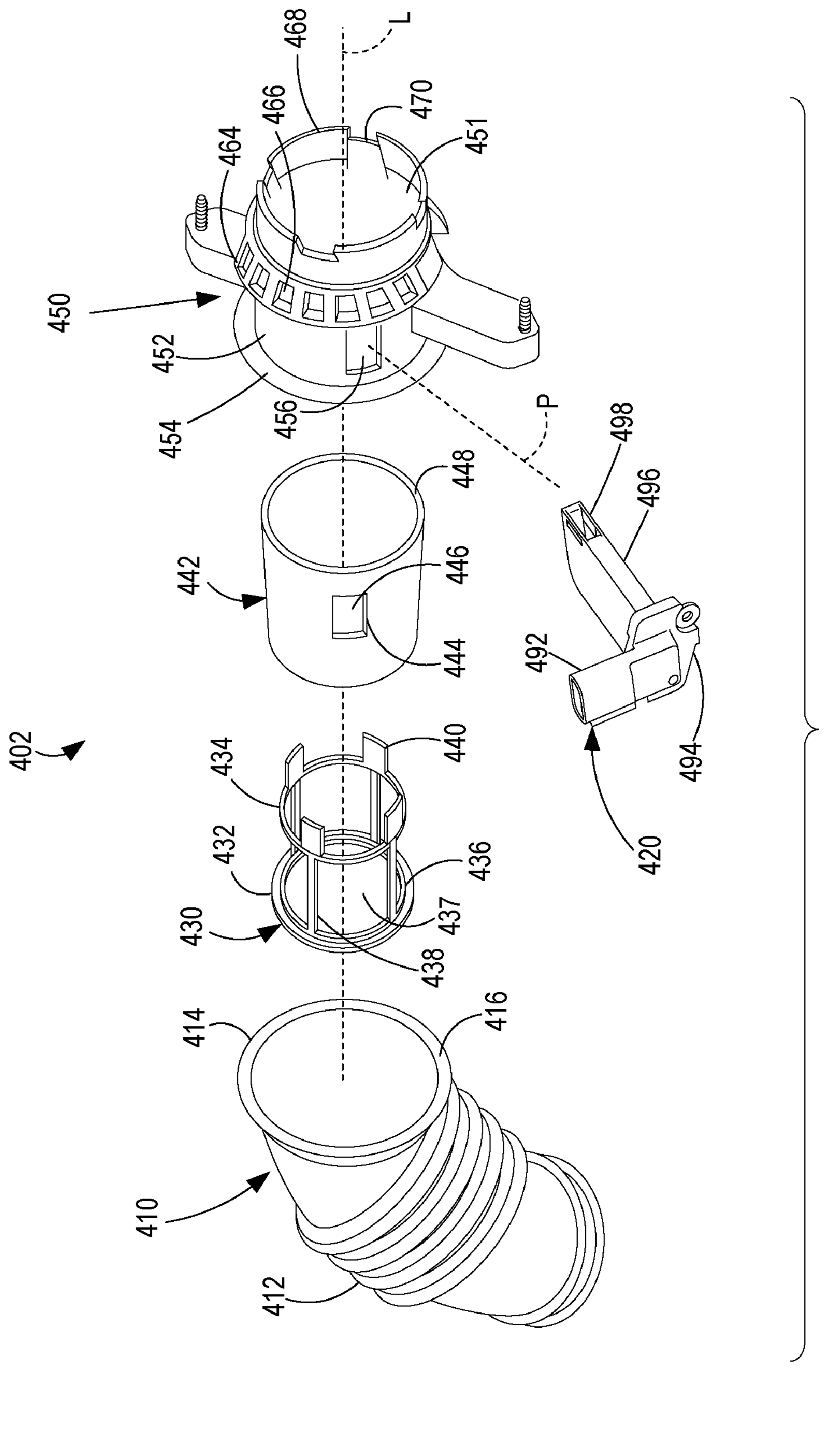
FIG. 4 shows an exploded view of an example sleeve hydrocarbon trap and clean air duct.

Referring now to FIG. 4, an exploded view of an example sleeve hydrocarbon trap 402 and clean air duct 410 is provided. The sleeve hydrocarbon trap includes a cage 430 and a hydrocarbon adsorbing sleeve 442. As discussed above, the sleeve hydrocarbon trap may be penetrated by a MAF sensor 420 and disposed in a MAF bore 430, coupled to the clean air duct 410. Further, the sleeve hydrocarbon trap may be disposed in the MAF bore. Further still the MAF bore may be coupled to the clean air duct 410 and/or an air filter box cover (not shown). It will be appreciated that the sleeve hydrocarbon trap 402, MAF bore 450 and clean air duct 410 may be assembled in a lateral direction, e.g. along dashed line L. Further, the MAF bore and sleeve hydrocarbon trap may be penetrated by a MAF sensor 420 in a perpendicular or radial direction e.g. along dashed line P.

The sleeve hydrocarbon trap 402 includes a hydrocarbon adsorbing sleeve 442 and a cage 430. The cage may be made of plastic or another lightweight, strong, smooth and/or non-flow impeding material. The cage 430 may include locking or positioning structure, for example a clean air ring 432 and a filter box ring 434. Clean air ring 432 may further include an inner ring 436, and filter box ring 434 as well as a tab 440. The cage may also include one or more ribs 438 which define a window 437 which may expose a portion of a retained hydrocarbon adsorbing sleeve.

In some examples, clean air ring 432 and/or filter box ring 434 include alignment and coupling features. For example, inner ring 436 may retain the hydrocarbon adsorbing sleeve. In alternate examples, a bevel or at least one notch is included additionally, or in place of, the inner ring 436. Further, the clean air ring 432 may feature tabs, fasteners, or teeth as well as notches, detents or other fastening or securing mechanisms. Such features may couple and align the cage 430 with MAF bore 450, clean air duct 410, and/or hydrocarbon adsorbing sleeve 442. The clean air ring 432 may have a larger outer radius than the filter box ring 434 to restrict the motion, such as lateral movement, of the hydrocarbon adsorbing sleeve 442. In some examples, a filter box ring further may include a tab 440 for coupling the sleeve hydrocarbon trap to the air filter box cover 424. In other examples, the cage may also include additional tabs, teeth, notches, fasteners, bevels, etc. Such further features may be used for aligning or coupling together the hydrocarbon adsorbing sleeve 442, MAF bore 450, and/or air filter box cover 424.

In the illustrated example, a rib 438 bridges the two rings. In some examples, more than one rib may be present to secure the clean air ring to the filter box ring and enable a constant separation distance therebetween. In further such examples, ribs may be positioned around the circumference of the rings, defining window 437, and exposing the hydrocarbon adsorbing sleeve 442. In some examples, the ribs may be substantially parallel to the direction of flow of the air, for example parallel to dashed line L. It should be appreciated that other configurations are considered for the cage. Further still, at least one of adhesive, bonding, welding, staking, and fasteners may be included in the sleeve hydrocarbon trap for retaining, positioning and/or securing the hydrocarbon adsorbing sleeve in addition to the cage.

Hydrocarbon adsorbing sleeve 442, may have a cylindrical shape, a diameter and one or more hydrocarbon adsorbing sheet layers. The number of hydrocarbon adsorbing layers may determine adsorbing properties of the hydrocarbon adsorbing sleeve, for example an adsorbing capacity. The hydrocarbon adsorbing sleeve 442 may be made of a die cut sheet of hydrocarbon adsorbing material, for example a hydrocarbon adsorbing sheet described in more detail below in FIG. 5. The hydrocarbon adsorbing sleeve may be constructed or formed by rolling the hydrocarbon adsorbing sheet into a cylindrical or partially cylindrical shape. Further, the hydrocarbon adsorbing sheet may include alignment structures which define a sensor opening 446 for the MAF sensor.

Adsorbing capacity of the hydrocarbon adsorbing sleeve 442 may be determined by a diameter of a sensor bore where the hydrocarbon adsorbing sleeve is disposed, a diameter of the cage, a capacity of an engine, a diameter of a clean air duct or other like considerations. For example, due to an increased engine capacity, an adsorbing capacity of the hydrocarbon adsorbing sleeve may be increased. The adsorbing capacity may be increased by increasing an adsorbing surface area, in some examples by increasing the length of the hydrocarbon adsorbing sleeve. In other examples, the hydrocarbon adsorbing sleeve may have an increased number of hydrocarbon adsorbing sheet layers. In some such examples, the number of hydrocarbon adsorbing sheet layers may be treated as adding more length. In other such examples, increasing hydrocarbon adsorbing sheet layers may be considered 90% to 80% as effective as increasing the surface area of the hydrocarbon adsorbing sleeve by increasing length. Because the hydrocarbon adsorbing sleeve is simple to construct and requires a limited amount of hydrocarbon adsorbing material, it may be readily scalable across different hydrocarbon adsorbing sleeve diameters, number of hydrocarbon adsorbing sheet layers, and hydrocarbon adsorbing sleeve lengths.

MAF bore 450 is one example of sensor bore 250. Further, MAF bore 450 may be made of plastic or similar light weight and durable material and may have sleeve hydrocarbon trap 402 abutting an inner wall 451. The MAF bore may have structure independent of the sleeve hydrocarbon trap for retaining and holding the MAF sensor 420 in place.

During operation of an engine, air may flow through the air induction system, and the MAF sensor 420 may measure the amount of air entering the engine, as described above at FIG. 1. Furthermore, in order to enable proper MAF function, the length and diameter of the MAF bore must take into consideration the size of the engine and the flow passing to the MAF sensor. In some such examples, engines with an increased number of cylinders, or capacity may determine an increased diameter of a MAF bore e.g. a V6 engine may have a larger sensor bore than an I4 engine. In other such examples, the MAF bore must be straight and have a constant cross sectional area, or include other features to enable smooth (e.g. laminar) flow and thus improve a MAF sensor accuracy.

The MAF bore may include a body 452, featuring a clean air end 454, and a filter box end 468. A filter box seal 464, including spacers 466 may encircle the MAF bore body 452. Spacers 466 may be adapted to reduce the weight of the component. Further still, MAF bore may be coupled to the clean air duct 410 via the clean air end 454 via fasteners, screws, adhesion, molding, tabs and the like. The clean air end may include aligning features, for example a bevel or notch to align the clean air duct, hydrocarbon adsorbing sleeve, and/or cage. By coupling the MAF bore to an air filter box, a sleeve hydrocarbon trap disposed therein may be made more inaccessible, and thus more tamper resistant.

The MAF bore body 452 may have interior features for aligning the cage and/or hydrocarbon adsorbing sleeve. In some examples, notches, tabs, protrusions, grooves and the like on or in the hydrocarbon adsorbing sleeve, the cage and the MAF bore may be used for alignment. Alignment features may be used to ensure that a MAF bore hole 456, sensor opening 446 and cage window 437 align when assembled. In this way, the MAF sensor body 496 may be inserted through the MAF bore, hydrocarbon adsorbing sleeve and cage. The size and relative location of the sensor opening 446, MAF bore hole 456 and the cage window 437 may be adapted to enable the insertion of the MAF sensor into the MAF bore. Furthermore, disposing the sleeve hydrocarbon trap within the MAF bore may utilize packaging space in multiple ways, increasing packaging space efficiency.

The filter box end 468 of the MAF bore 450 may include alignment and coupling features for securing the sleeve hydrocarbon trap in the MAF bore. Further, the filter box end 468 may include alignment and coupling features for retaining the MAF bore to the air filter box cover. For example, the filter box end may include a slot 470 for receiving a tab 440 to align and couple the sleeve hydrocarbon trap and the MAF bore to each other. The received tab may further be coupled to an air filter box cover with a complimentary mating feature located on the air filter box cover (not shown).

Clean air duct 410 may include a pliable element, for example flexible elbow 412, and a mating end 414. In further examples, flexible elbow 412 may include or be replaced by a living hinge or other such structure. Mating end 414 which may function to secure the clean air duct 410 to the cage 430 and/or MAF bore 450. Further, the mating end 414 may include a mating end face 416, and be circular. In some examples the mating end 414 and may have a constant diameter. In other examples the mating end may not be circular, but may be rectangular, elliptical or other such shape. The mating end may include screws, fasteners or other securing and aligning features, such as notches or tabs. Mating end face 416 may include a mating edge, bevel, divot, and/or beading. Such features may be used for alignment and coupling with the cage 430 and/or MAF bore 450.

MAF sensor 420 may include a MAF sensor body 496, including an air inlet 498, a data port connection 492 and a mount 494 couple between the data port connection and MAF sensor body. The air inlet 498 may enable the flow of air into the MAF sensor body 496 in a controlled manner. The sensor body may include electronic circuitry and the like for measuring the flow and mass of air entering through the air inlet 498. The sensor body 496 may be inserted into the MAF bore. MAF sensor 420 may measure an amount of air which flows through a MAF bore before it flows to the clean air duct 410. The mount 494 may be coupled to the MAF bore by a fastener, screw, adhesive, or the like, and may include further such alignment and coupling features. The data port connection 492 may send electronic signals from the MAF sensor 420 to a controller, for example controller 12.

Figure 5:
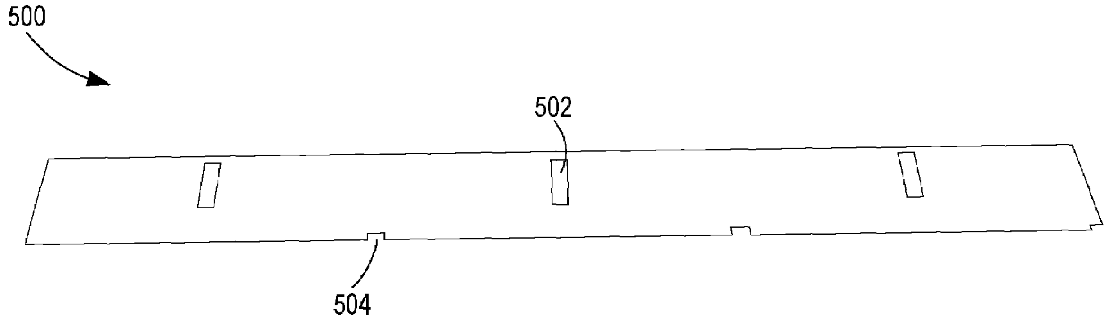
FIG. 5 illustrates formation of a hydrocarbon adsorbing sleeve.

FIG. 5 shows a hydrocarbon adsorbing sheet 500 of hydrocarbon adsorbing material. The hydrocarbon adsorbing sheet may be rolled into a hydrocarbon adsorbing sleeve, for example hydrocarbon adsorbing sleeves 442, and 542. The hydrocarbon adsorbing sheet 500 may be formed by a cut, and may be rectangular in form. In some examples a die cut may be used to shape the hydrocarbon adsorbing sheet to a desired width and length from a larger piece of hydrocarbon adsorbing material. The width of the hydrocarbon adsorbing sheet may determine the length of a hydrocarbon adsorbing sleeve. The length of the hydrocarbon adsorbing sheet may determine, at least in part, the number of layers of a hydrocarbon adsorbing sleeve.

The hydrocarbon adsorbing sheet may further include alignment features, such as pattern holes 502 and pattern notches 504. For example, when sheet is in a rolled state, the pattern holes may overlap and define a sensor opening. In the present example, the hydrocarbon adsorbing sheet 500 has 3 pattern holes and 3 pattern notches, the pattern holes and pattern notches periodically spaced. The position of the pattern holes may depend on the position of the MAF sensor. In the illustrated example, the pattern holes may be substantially interior to the hydrocarbon adsorbing sheet so that they are surrounded by hydrocarbon adsorbing material. In alternate examples, the hydrocarbon adsorbing sheet may have more than or less than 3 pattern holes and more than or less than 3 notches. In still further alternate embodiments, pattern holes may be cut into the edge of the hydrocarbon adsorbing sheet. The pattern holes and pattern notches may be one example of a pattern that may be die cut into the hydrocarbon adsorbing sheet 500.

Figure 6:
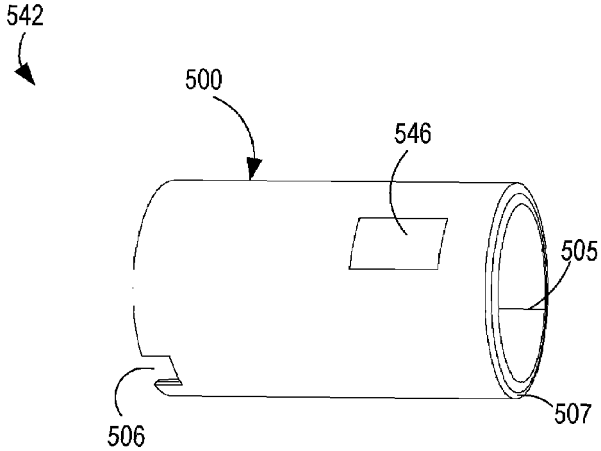
FIG. 6 illustrates an example hydrocarbon sleeve including multiple adsorbing sheet layers.

FIG. 6 illustrates an example hydrocarbon adsorbing sleeve 542 including multiple hydrocarbon adsorbing sheet layers 507. As described above, the hydrocarbon adsorbing sleeve 542 may a hydrocarbon adsorbing sheet in a rolled state, for example hydrocarbon adsorbing sheet 500. In further examples, hydrocarbon adsorbing sleeve 542 may comprise one or more layers, the layers stacked one layer on top of another. In still further examples, sleeve 542, formed from layers, for example, may be formed into a "C" shape, where a longitudinal slot is formed along the entire length of the sleeve (by not completely wrapping the sheet, or layers of sheets, onto themselves) so that when viewed from the rear (such as the view shown in FIG. 9), the sleeve's form may approximate the letter "C." The sleeve 542 may comprise such a longitudinal slot be in place of pattern holes 502 and pattern notches 504 or in addition to pattern holes 502 and pattern notches 504. In examples comprising the longitudinal slot, but not the pattern holes 502, a MAF sensor may be inserted through the longitudinal slot.

The hydrocarbon adsorbing sleeve may include an exposed edge 505. In one such example, pattern holes 502 and pattern notches 504 have been aligned so that they are congruent and form sensor opening 546 and sleeve notch 506, respectively. In some examples, although not required, an adhesive, a fastener, and the like may be used to maintain the hydrocarbon adsorbing sleeve's shape and alignment.

As described above, the hydrocarbon adsorbing sleeve 542 may have one or more adsorbing sheet layers 507. Where the number of hydrocarbon adsorbing sheet layers is greater than one, there may be an inner layer and an outer layer. The number of layers may determine the adsorbing capacity of the hydrocarbon adsorbing sleeve 542, as described above at FIG. 4. In some examples the hydrocarbon adsorbing sleeve may have 2 layers; in others 3 layers. In further examples, a hydrocarbon adsorbing sleeve may have as many as 5 or more layers. As hydrocarbons are adsorbed by the hydrocarbon adsorbing sleeve, they may migrate within the hydrocarbon adsorbing sleeve from the inner layer to the outer layer. However, effectiveness of the outer layer to adsorb may decrease due to the inner layer and a number of intervening layers therebetween interfering with migration.

Figure 7:
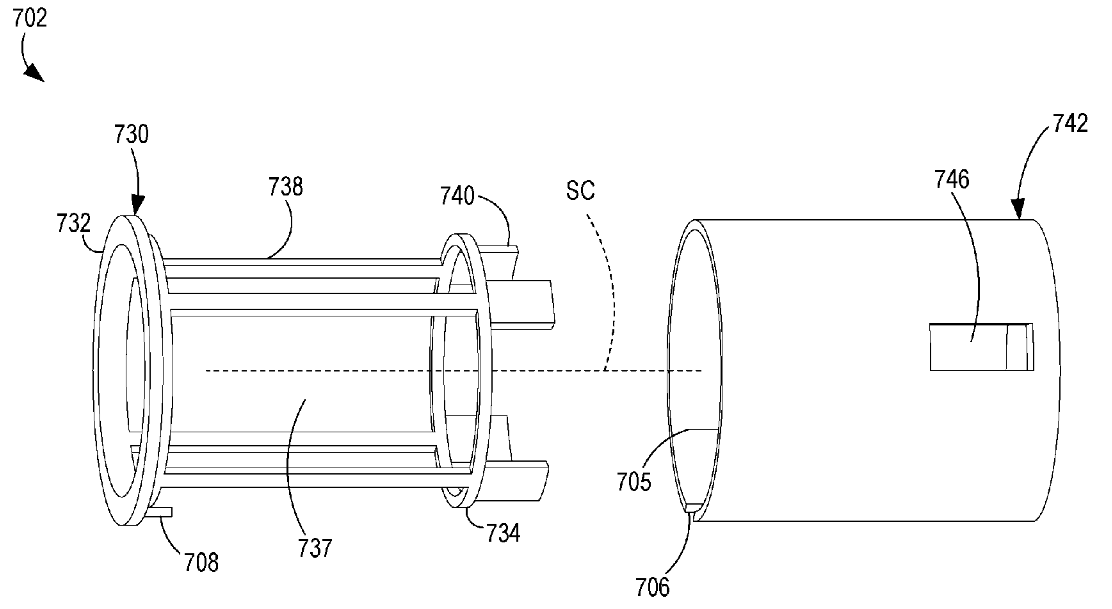
FIG. 7 is an exploded view of an example hydrocarbon trap including a cage and a hydrocarbon adsorbing sleeve.

FIG. 7 is an exploded view of an example sleeve hydrocarbon trap 702, including a cage 730 and a hydrocarbon adsorbing sleeve 742. The cage may further include a cage tab 708 and the hydrocarbon adsorbing sleeve may further include a sleeve notch 706. The hydrocarbon adsorbing sleeve may be telescopically inserted over the top of the cage along the dashed line SC. The cage tab 708 may be inserted into sleeve notch 706 to provide alignment of the hydrocarbon adsorbing sleeve with respect to the cage. In one example, such an alignment feature may enable the sensor opening 746 to be substantially over, or on top of, a cage window 737. In another example, an exposed edge 705 of an inner layer of the hydrocarbon adsorbing sleeve may be covered by a rib. Further, such an alignment feature as mentioned above may ensure that the exposed edge 705 be covered by a rib. Further still, the clean air ring 732 may retain and impede movement of the hydrocarbon adsorbing sleeve, as described above in FIG. 4.

Figure 8:
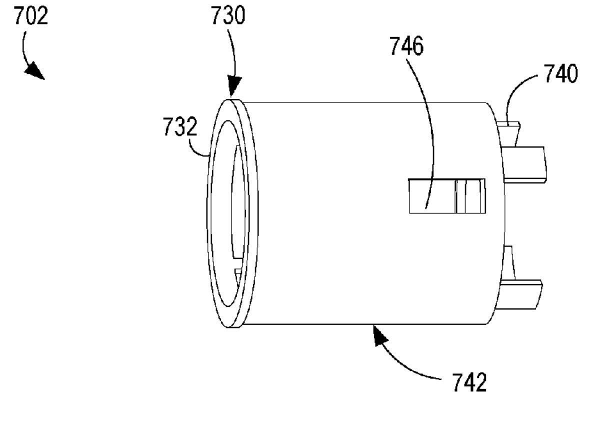
FIG. 8 is a side view of an assembled example sleeve hydrocarbon trap.

FIG. 8 shows a side view of an assembled example sleeve hydrocarbon trap 702 including a cage 730 and a hydrocarbon adsorbing sleeve 742. The hydrocarbon adsorbing sleeve and cage may be further assembled with a sensor bore, for example a MAF bore (not shown). A sensor opening 746 may enable the insertion of a sensor, for example a MAF sensor (not shown), through the hydrocarbon adsorbing sleeve and cage. The sensor opening may be of a shape and a dimension at least the shape and dimension of a MAF sensor. Further, the sensor opening may be of a shape and dimension larger than a MAF sensor to allow a tolerance when the MAF sensor is inserted. In this way, a MAF sensor may be accommodated, and edges of the sensor opening 746 may be prevented from protruding along a MAF sensor.

Figure 9:
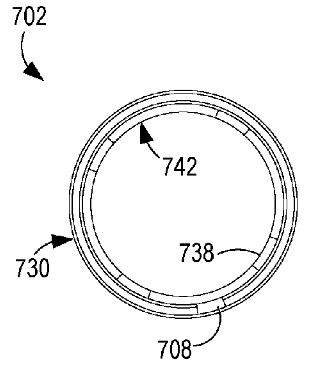
FIG. 9 is a rear view of the example hydrocarbon trap of FIG. 8.

FIG. 9 is a rear view of the example hydrocarbon trap 702 of FIG. 8. A rib 738 may be used to retain the hydrocarbon adsorbing sleeve 742. It will be appreciated that a cage tab 708 and/or a sleeve notch may enable an alignment of the cage with the hydrocarbon adsorbing sleeve. The cage and hydrocarbon adsorbing sleeve may be further assembled with a MAF bore by disposing the hydrocarbon adsorbing sleeve and cage within a MAF bore.

Figure 10:
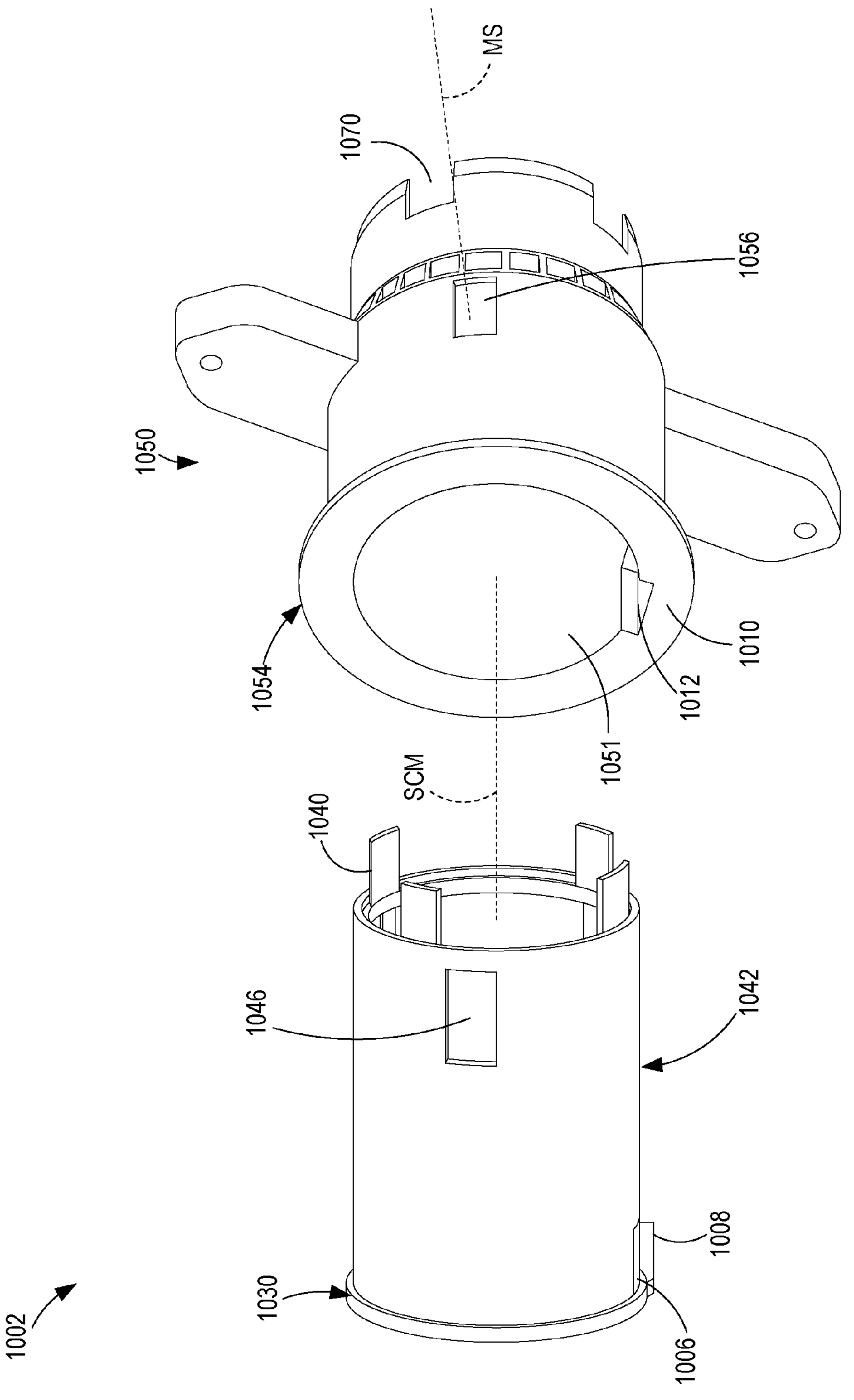
FIG. 10 shows a partially exploded view of a sleeve hydrocarbon trap and a MAF bore.

FIG. 10 is a partially exploded assembly view of an example sleeve hydrocarbon trap 1002 and an example MAF bore 1050. A MAF bore 1050 may include clean air end 1054. Clean air end 1054 may include a clear air face 1010 with a MAF bore notch 1012. MAF bore notch 1012 may align with a cage tab 1008 and/or a sleeve notch to enable an alignment and positioning of the MAF bore in relation to the sleeve hydrocarbon adsorbing trap. In other examples, clean air end 1054 and/or clean air face 1010 may further include a depression, dent, notch, bevel, slot, fastener or other such further alignment, locking and positioning features. Further still, cage 1030 and the sleeve hydrocarbon trap 1042 may be inserted telescopically along a dashed line SCM. The sleeve hydrocarbon trap may be retained by a fastener, screw, adhesive or the like, in a direction parallel to SCM or perpendicular to SCM.

Yet still further, a MAF sensor (not shown) may be inserted radially through the MAF bore 1050, and sleeve hydrocarbon trap 1002, as along dashed line MS. In some examples, tab 1040 may be inserted into slot 1070, to lock the cage 1030 in place with respect to the MAF bore 1050 and thus retain hydrocarbon adsorbing sleeve 1042 against an inner wall 1051 of the MAF bore. In further examples, the cage may be augmented or replaced by adhesive and/or welding to secure and retain the hydrocarbon adsorbing sleeve 1042 against the inner wall 1051.

Alignment and positioning features, for example tab 1040, slot 1070, sleeve notch 1006, cage tab 1008 and MAF notch 1012, may enable telescopic insertion of the sleeve hydrocarbon trap along line SCM. Further, such alignment and positioning features may enable the sensor opening 1046, to be congruent and aligned with a MAF bore hole 1056.

Figure 11:
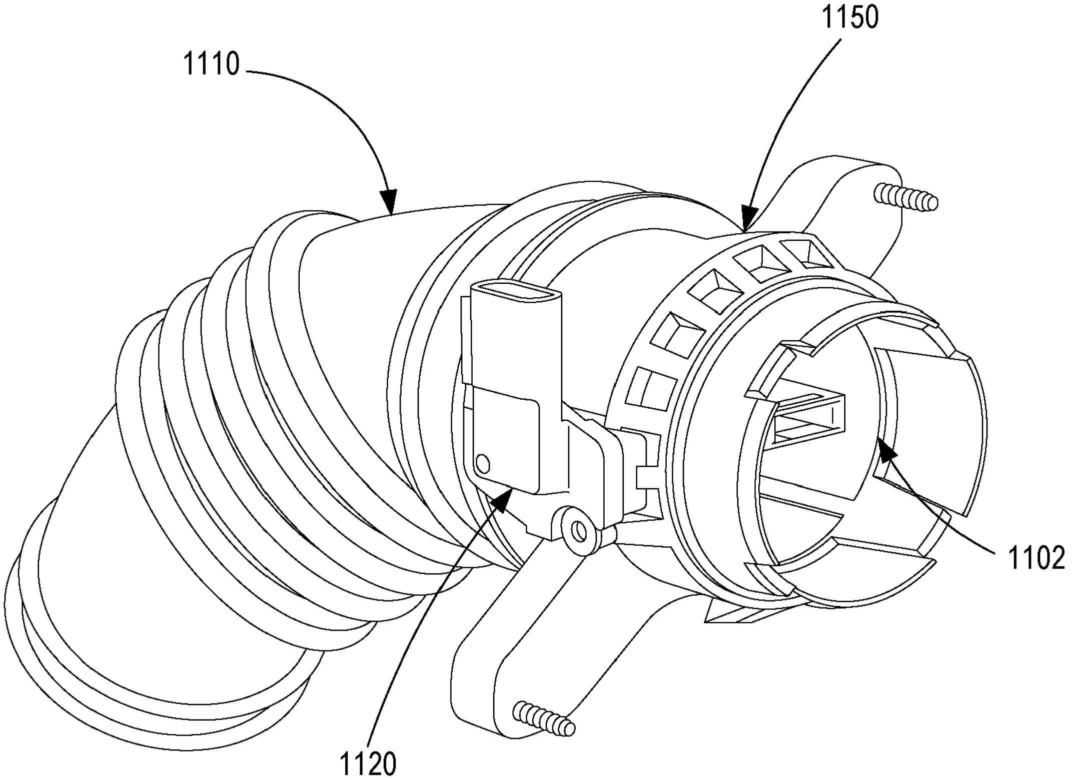
FIG. 11 is a sleeve hydrocarbon trap disposed in a portion of the air induction system.

FIG. 11 is a sleeve hydrocarbon trap 1102 disposed in a portion of an air induction system. The sleeve hydrocarbon trap 1102 may be disposed inside a MAF bore 1150. A MAF sensor 1120 may penetrate through the MAF bore 1150 and the sleeve hydrocarbon trap 1102. The MAF bore 1150 and the sleeve hydrocarbon trap 1102 may be further coupled and integrated into an air filter box cover (not shown), and clean air duct 1110.

Figure 12:
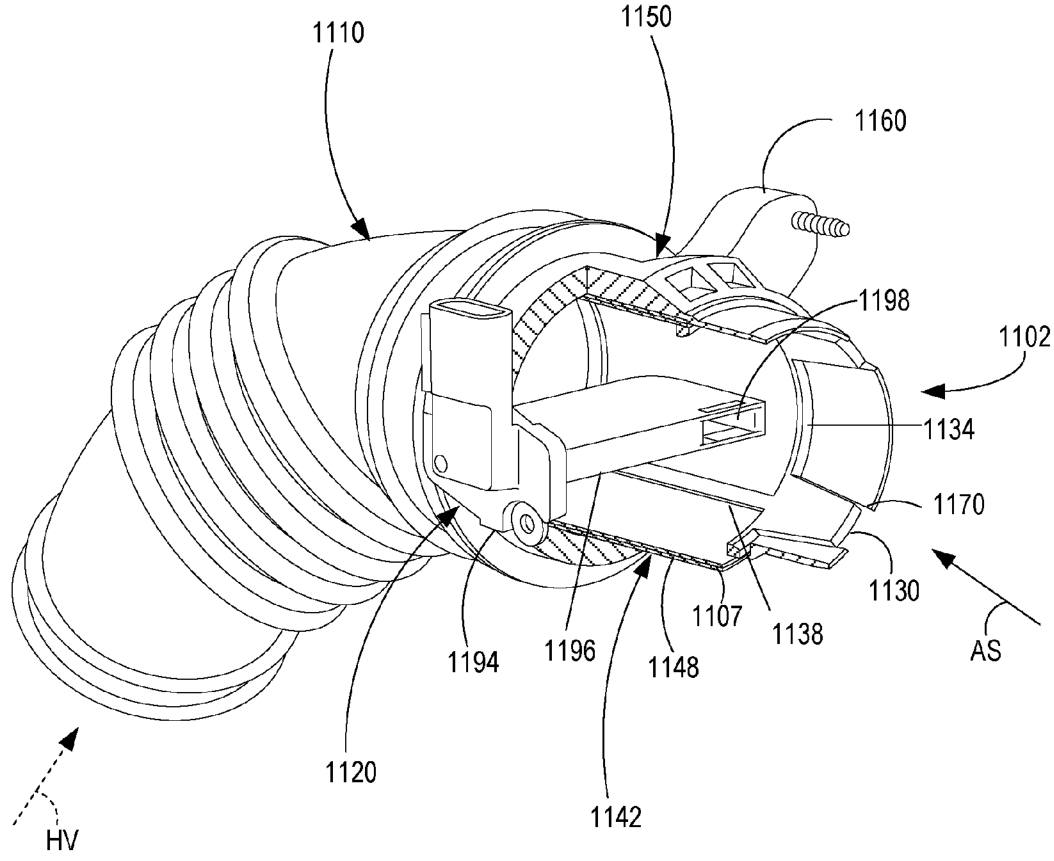
FIG. 12 shows a partial cut away perspective view of an example sleeve hydrocarbon trap disposed in a portion of the air induction system.

FIG. 12 shows a partial cut away perspective view of an example sleeve hydrocarbon trap 1102 disposed in a portion of an air induction system. The hydrocarbon adsorbing sleeve 1142 may be inserted over the cage 1130 to form sleeve hydrocarbon trap 1102. Sleeve hydrocarbon trap 1102 may then be inserted inside of the MAF bore 1150. The MAF sensor 1120 may then be inserted through the MAF bore, hydrocarbon adsorbing sleeve, and cage to assemble the sleeve hydrocarbon trap, as described in more detail below at FIG. 13. The sleeve hydrocarbon trap 1102 and/or MAF bore 1150 may be coupled to clean air duct 1110. Alignment and coupling features included in the cage, the hydrocarbon adsorbing sleeve, the MAF bore the clean air duct and the MAF sensor may help determine assembly of the sleeve hydrocarbon trap and how it is disposed in an air induction system.

The hydrocarbon adsorbing sleeve may have a sleeve edge 1148, which in this examples shows that the hydrocarbon adsorbing sleeve 1142 may have one or more layers 1107. Further, the relative position of the MAF sensor may be seen in this figure, as the MAF body penetrates through the MAF bore, the cage, and the hydrocarbon adsorbing sleeve to enable placement of the air inlet 1198 and MAF sensor body 1196 opposed to a direction of the intake air stream AS.

FIG. 12 further illustrates retainment of the hydrocarbon adsorbing sleeve 1142 by cage 1130. For example, the cage may include a filter box ring 1134 and ribs 1138. The ring may cover a sleeve edge, thereby inhibiting the sleeve from dangling or protruding and thus disrupting air flow through the MAF bore.

Figure 13:
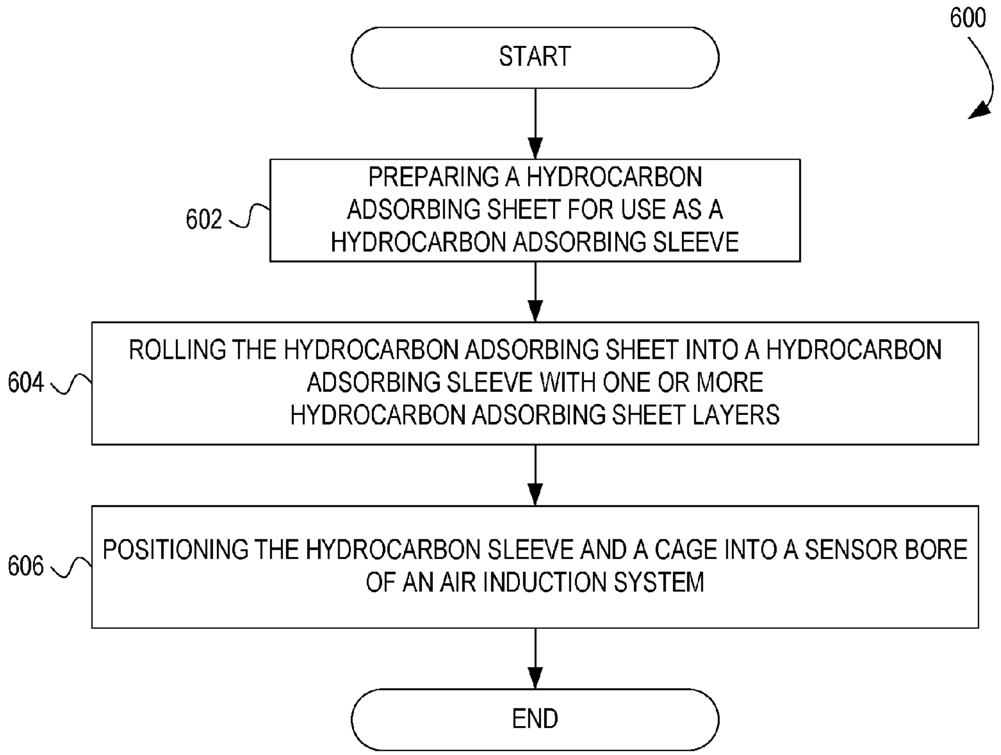
FIG. 13 shows a flow chart illustrating an example manufacturing method.

FIG. 13 is a flow chart illustrating a method 600 that may be used for constructing and installing the sleeve hydrocarbon trap in accordance with one example. The method 600 may include, at 602, preparing a hydrocarbon adsorbing sheet for use as a sleeve. Preparing a hydrocarbon adsorbing sheet may include sizing and/or cutting a hydrocarbon adsorbing material to fit into a sensor bore. Further, alignment features may be cut into the sheet. The cutting may be done, for example, with a die cutting operation.

At 604, the method may further include rolling the hydrocarbon adsorbing sheet into a hydrocarbon adsorbing sleeve. The rolled sleeve may have one or more hydrocarbon adsorbing sheet layers. The number of hydrocarbon adsorbing sheet layers may determine an adsorbing capacity of the hydrocarbon adsorbing sleeve.

At 606, the method may include positioning the sleeve and a cage into a sensor bore, such as a MAF bore, of an air induction system. For example, in some systems, the sleeve may be positioned in the sensor bore and the cage inserted to lock the sleeve into position. In other examples, the cage may be telescopically inserted into the sleeve. The sleeve may be locked by the cage into position such that it substantially abuts the inner wall of the sensor bore. The method may further include alignment of the sleeve and cage. Alignment features of the cage and hydrocarbon adsorbing sleeve may be used to assist in the positioning of the sleeve and cage.

It should be appreciated that a hydrocarbon adsorbing sleeve retained by a cage in a MAF bore may minimize use of packaging space. For example, such a use of packaging space may integrate a hydrocarbon adsorbing material with the placement of a MAF sensor, increasing spatial efficiency and thus increasing engine configuration flexibility. Further, the disclosed sleeve hydrocarbon trap may include a sleeve that is simple and uses minimum materials. In this way, the design of the sleeve hydrocarbon trap may be more adaptable and scalable across a range of applications, for example in different engines. Further still, the sleeve hydrocarbon trap assembly may enable the use of a smaller air filter box, because of the exclusion of a bypass or flow through filter disposed in the air filter box. Further, as briefly mentioned above, the sleeve hydrocarbon trap in some examples, may be coupled to the air filter box cover. Some such approaches may be tamper inhibiting as it may be difficult to easily access the hydrocarbon adsorbing sleeve.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sleeve hydrocarbon trap, comprising:

a hydrocarbon adsorbing sleeve positioned in a sensor bore and including one or more hydrocarbon adsorbing layers; and a cage adapted to retain the hydrocarbon adsorbing sleeve in the sensor bore, wherein said hydrocarbon adsorbing sleeve is a hydrocarbon adsorbing sheet in a rolled state with one or more hydrocarbon adsorbing layers and wherein the sensor bore is a MAF sensor bore, and wherein the hydrocarbon adsorbing sleeve further comprises at least one of a plurality of sleeve pattern holes cut into the hydrocarbon adsorbing sheet, where in the rolled state, the sleeve pattern holes overlap to form a sensor hole, the sensor hole positioned with a sensor inserted through the hydrocarbon adsorbing sleeve, and a plurality of sleeve pattern notches cut into the edge of the hydrocarbon adsorbing sheet, where in the rolled state, the sleeve pattern notches overlap to form a sleeve notch orienting the hydrocarbon adsorbing sleeve within the sensor bore.

2. The sleeve hydrocarbon trap of claim 1 further comprising at least one of adhesive, bonding, welding, staking, and fasteners for retaining, positioning and/or securing the hydrocarbon adsorbing sleeve.

3. The sleeve hydrocarbon trap of claim 1, wherein the hydrocarbon adsorbing sleeve is composed of one or more of carbon impregnated sheet, carbon coated foam, activated charcoal, or zeolite.

4. The sleeve hydrocarbon trap of claim 1, wherein the cage further comprises:

an alignment feature, the alignment feature positioning the cage relative to the sensor bore and hydrocarbon adsorbing sleeve such that the sensor can be placed through the sensor bore while the cage and sleeve are inserted into the bore.

5. The sleeve hydrocarbon trap of claim 1, wherein the cage further comprises:

a tab, capable of mating with a slot of the sensor bore to couple together the cage and the sensor bore and the coupling of the tab and slot further aligning the cage relative to the sensor bore and the tab further coupling the sleeve hydrocarbon trap to an air filter box.

6. The sleeve hydrocarbon trap of claim 1, wherein the cage further comprises:

a ring, partially disposed within the sensor bore and laterally retaining the hydrocarbon adsorbing sleeve, the ring also including an alignment feature that couples and aligns the sleeve hydrocarbon trap to a clean air duct.

7. The sleeve hydrocarbon trap of claim 1, wherein the cage further comprises:

a plurality of ribs, connected to a ring, the plurality of ribs defining one or more windows through the cage, the windows exposing air inside the cage to the hydrocarbon adsorbing sleeve when the sleeve is disposed around the exterior of the cage.

8. The sleeve hydrocarbon trap of claim 7, wherein at least one of the plurality of ribs of the cage and the ring of the cage retains the hydrocarbon adsorbing sleeve so that the sleeve abuts the inner wall of the sensor bore, substantially preventing the sleeve from protruding toward the center of the sensor bore.

9. A sleeve hydrocarbon trap, comprising:

a hydrocarbon adsorbing sleeve positioned in a sensor bore and including a hydrocarbon adsorbing layer; and a cage adapted to retain the hydrocarbon adsorbing sleeve in the sensor bore comprising ribs connected to a ring and defining windows through the cage exposing air inside the cage to the sleeve, the sleeve disposed around the cage's exterior, an exposed edge of the sleeve hidden behind one of the ribs.

10. The sleeve hydrocarbon trap of claim 9, wherein the sleeve hydrocarbon trap is located downstream of an air filter box in a flow of fresh air flowing to an engine.

11. The sleeve hydrocarbon trap of claim 9, wherein the sleeve hydrocarbon trap is located upstream of a positive crankcase ventilation (PCV) opening in a flow of fresh air flowing to an engine.

12. The sleeve hydrocarbon trap of claim 11, wherein the trap is located a distance of two inches or more from the PCV opening.

13. A method of making a sleeve hydrocarbon trap to be disposed within an air induction system of an engine, the sleeve hydrocarbon trap retaining emissions, the method comprising:

preparing a hydrocarbon adsorbing sheet for use as a hydrocarbon adsorbing sleeve;

rolling the hydrocarbon adsorbing sheet into a hydrocarbon adsorbing sleeve with one or more hydrocarbon adsorbing sheet layers;

positioning the hydrocarbon adsorbing sleeve and a cage into a sensor bore of the air induction system;

cutting periodically spaced sleeve pattern notches into the exterior edge of the hydrocarbon adsorbing sheet;

cutting periodically spaced sleeve pattern holes into the hydrocarbon adsorbing sheet;

attaching the sleeve hydrocarbon trap to an air filter box via locking tabs included in the cage, the cage penetrating through the end of the sensor bore; and attaching the sleeve hydrocarbon trap to a clean air duct, the sleeve hydrocarbon trap aligning with the clean air duct via a beading on the face of the clean air duct and a beveling on a ring of the cage, and the sleeve hydrocarbon trap coupling to the clean air duct via a snap fit;

the rolling up the hydrocarbon adsorbing sheet into a hydrocarbon adsorbing sleeve with one or more hydrocarbon adsorbing layers further comprising aligning sleeve pattern holes to radially overlap to form a sleeve hole and sleeve pattern notches to radially overlap to form a sleeve notch; and the positioning the hydrocarbon sleeve and the cage into the sensor bore further comprising aligning a cage tab, sleeve notch and bore notch, aligning the tab of the cage with a slot of the sensor bore and retaining the hydrocarbon adsorbing sleeve against an inner wall of the sensor bore with the cage.

* * * * *